P. H. Niles,
Hose Coupling.
N° 76,503.                                      Patented Apr. 7, 1868.
Fig. 1.                          Fig. 2.
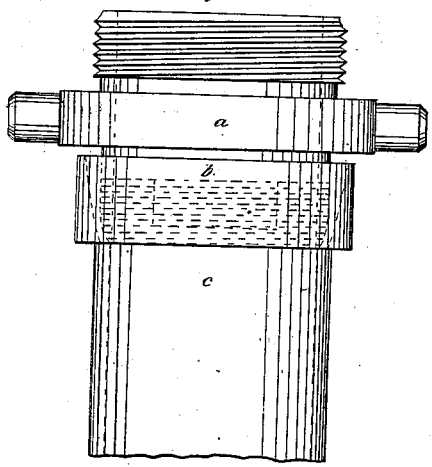
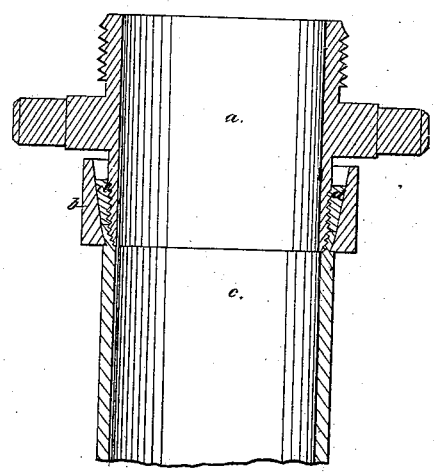
Fig. 3.                          Fig. 5.
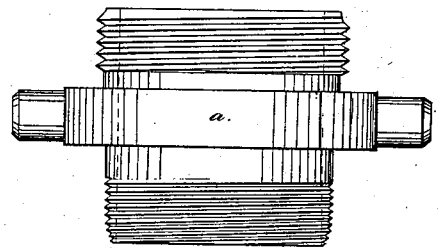
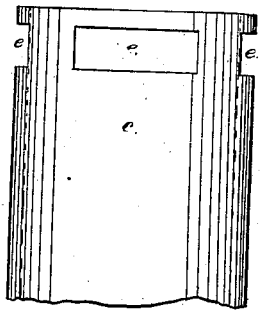
Fig. 4.
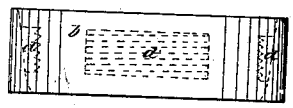
Witnesses:                                      Inventor:

United States Patent Office.

PETER H. NILES, OF BOSTON, MASSACHUSETTS.

Letters Patent No. 76,503, dated April 7, 1868.

---

IMPROVEMENT IN HOSE-COUPLINGS.

---

The Schedule referred to in these Letters Patent and making part of the same.

---

Be it known that I, PETER H. NILES, of Boston, in the county of Suffolk, and State of Massachusetts, have invented a new and useful Improvement in Connecting Hose to Couplings and Pipes; and I do hereby declare the following to be a full and exact description thereof, reference being had to the accompanying drawings, and to the letters of reference marked thereon.

To enable others skilled in the art to make and use my invention, I will proceed to describe its construction and operation.

Upon the accompanying drawings—

Figure 1 is an elevation.

Figure 2 is a section of the same.

Figures 3, 4, and 5 are detached views of the several parts.

Upon the shank of a coupling, $a$, a screw is cut, upon which the nut $b$ travels.

The shank $a$ is made slightly tapering at the rear end, to admit of the hose $c$ being drawn over it readily, and a metallic connection made before turning up the nut; also to act in combination with the contracted end of the nut in compressing the hose.

The nut $b$ is made with three segments $d\ d\ d$ projecting from its inner face, and upon which a screw is cut coinciding with the screw cut upon the shank of the coupling.

These projecting segments are equidistant from the faces of the nut and from each other.

The rear end of the nut is contracted to coincide with the taper upon the shank, and when the nut is screwed up, to form a tight joint between the inclines by compression.

Three openings $e\ e\ e$ are cut through the hose $c$, of the size and shape of the segments, and the same distance from its end as the segments are from the face of the nut, allowing the segments to pass through and form a metallic connection with the shank, and bringing the end of the hose flush with the front face of the nut.

The openings being cut in the hose, as described, insert it inside the nut, allowing the segments to pass into and through the openings, bringing the inside surface of the hose flush with the inner face of the segments.

Pass the hose and nut over the shank, until the thread on it enters that of the segments, then screw up the nut and hose tightly.

1. I claim a segment-nut, in combination with the perforated hose, substantially as described.

2. I claim a segment-nut, and the perforated hose in position, in combination with the shank of the coupling, in the manner and for the purpose substantially as described.

P. H. NILES.

Witnesses:
JOHN B. BABCOCK,
G. H. WENTWORTH.